(12) United States Patent
Serebrennikov

(10) Patent No.: US 12,304,388 B2
(45) Date of Patent: May 20, 2025

(54) VEHICLE SIREN SYSTEM AND METHOD

(71) Applicant: Ford Global Technologies, LLC, Dearborn, MI (US)

(72) Inventor: Michael Serebrennikov, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 18/337,118

(22) Filed: Jun. 19, 2023

(65) Prior Publication Data
US 2024/0416834 A1   Dec. 19, 2024

(51) Int. Cl.
*G06V 20/58*   (2022.01)
*B60Q 5/00*   (2006.01)
*G06V 10/764*   (2022.01)

(52) U.S. Cl.
CPC ........... *B60Q 5/005* (2013.01); *G06V 10/764* (2022.01); *G06V 20/58* (2022.01)

(58) Field of Classification Search
None
See application file for complete search history.

(56) References Cited

U.S. PATENT DOCUMENTS

| | | | |
|---|---|---|---|
| 3,868,684 A | 2/1975 | Nunn, Jr. | |
| 4,980,837 A | 12/1990 | Nunn et al. | |
| 2005/0192746 A1 | 9/2005 | King et al. | |
| 2009/0174572 A1 | 7/2009 | Smith | |
| 2011/0066304 A1 | 3/2011 | Taylor | |
| 2017/0237945 A1 | 8/2017 | Murar et al. | |
| 2019/0023282 A1* | 1/2019 | Kuroda | B60Q 5/006 |
| 2019/0027032 A1 | 1/2019 | Arunachalam | |
| 2019/0279506 A1 | 9/2019 | Kelgernon | |
| 2019/0378150 A1 | 12/2019 | Patsiokas et al. | |
| 2021/0023987 A1* | 1/2021 | Bader | G01S 13/931 |
| 2022/0157165 A1 | 5/2022 | Dantrey et al. | |
| 2022/0284919 A1 | 9/2022 | Buddhadev et al. | |
| 2022/0363261 A1 | 11/2022 | Buck et al. | |

* cited by examiner

*Primary Examiner* — John F Mortell
(74) *Attorney, Agent, or Firm* — Frank Lollo; Price Heneveld LLP

(57) ABSTRACT

A vehicle comprises a camera system located on the vehicle and oriented to capture images in an imaged area along a travel path of the vehicle, a navigation system comprising map data, and a siren is located on the vehicle and configured to output different audible sounds in a plurality of siren modes. A controller processes the images that are captured with the camera system and the map data, and identifies an event based on the processed images and classifies the event as one of a plurality of stored events. The controller selectively activates the siren in one of the plurality of siren modes based on the classified event.

20 Claims, 5 Drawing Sheets

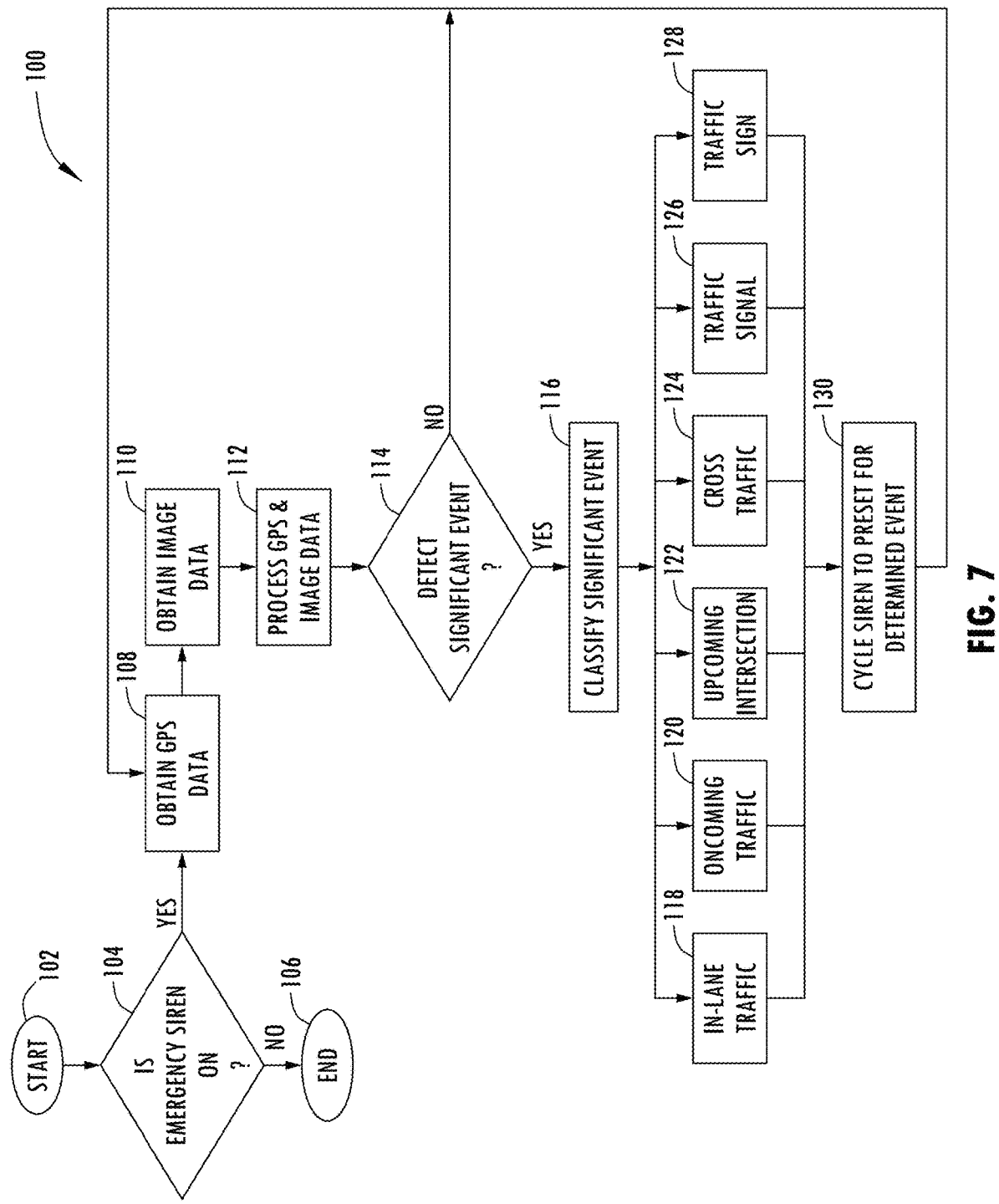

VEHICLE SIREN SYSTEM AND METHOD

FIELD OF THE DISCLOSURE

The present disclosure generally relates to motor vehicle alert systems, more particularly relates to a siren system for emergency-type service vehicles.

BACKGROUND OF THE DISCLOSURE

Emergency service vehicles, such as ambulances, fire and rescue vehicles and police vehicles typically include one or more sirens for alerting others nearby of the presence of the emergency service vehicle in certain circumstances. In some vehicles, the siren is typically manually activated. It would be desirable to provide for a vehicle siren system that may efficiently accommodate different driving events.

SUMMARY OF THE DISCLOSURE

According to a first aspect of the present disclosure, a vehicle comprises a camera system. The camera system is located on the vehicle and oriented to capture images in an imaged area along a travel path of the vehicle. A navigation system is included having map data. A siren is located on the vehicle and configured to output different audible sounds in a plurality of siren modes. A controller processes the images that are captured with the camera system and the map data, and identifies an event based on the processed images and classifies the event as one of a plurality of stored events. The controller selectively activates the siren in one of the plurality of siren modes based on the classified event.

Embodiments of the first aspect of the present disclosure can include any one or a combination of the following features:
  the event is a driving event that comprises another vehicle traveling in the travel path of the vehicle;
  the driving event comprises detecting an intersection crossing on the roadway and wherein the controller changes the siren mode upon detecting the vehicle approaching the intersection crossing;
  the driving event comprises a traffic signal indicating for the vehicle to stop;
  the driving event comprises detecting another vehicle approaching the roadway from a side of the roadway and wherein the controller changes the siren mode based on the detected another vehicle approaching the roadway;
  the driving event comprises oncoming traffic;
  the driving event comprises approaching a traffic control on the roadway;
  a sensor generating a sensor signal for sensing objects within the imaged area, wherein the controller identifies the event further based on the sensor signal;
  the vehicle comprises an emergency services vehicle; and
  the travel path comprises a roadway.

According to a second aspect of the present disclosure, a vehicle siren system comprises a camera system. The camera system is configured to be located on a vehicle and oriented to capture images in an imaged area along a travel path of the vehicle. A navigation system is included having map data. A siren is configured to be located on the vehicle and configured to output different audible sounds in a plurality of siren modes. A controller processes the images captured with the camera system and the map data and identifies a driving event based on the processed images and classifies the driving event as one of a plurality of stored driving events, where the controller selectively activates the siren in one of the plurality of siren modes to generate a pattern having tones and audible volume based on the classified driving event.

Embodiments of the second aspect of the present disclosure can include any one or a combination of the following features:
  the driving event comprises another vehicle traveling in the travel path of the vehicle;
  the driving event comprises detecting an intersection crossing on the roadway, and wherein the controller changes the siren mode upon the vehicle approaching the intersection crossing;
  the driving event comprises a traffic signal indicating for the vehicle to stop; and
  the driving event comprises detecting another vehicle approaching the roadway from a side of the roadway and wherein the controller changes the siren mode based on the detected another vehicle approaching the roadway.

According to a third aspect of the present disclosure, a method of controlling a siren on a vehicle comprises capturing images of a roadway in an imaged area along a path of the vehicle with a camera system, tracking the path of the vehicle and upcoming features with map data on a navigation system, determining when the vehicle is approaching a driving event based on the captured images and the map data, classifying the driving event as one of a plurality of known driving events, and controlling the siren to operate in one of a plurality of siren modes to generate an audible output in a pattern dependent upon the classified driving event.

Embodiments of the third aspect of the present disclosure can include any one or a combination of the following features:
  the driving event comprises another vehicle traveling in the travel path of the vehicle;
  the driving event comprises detecting an intersection crossing on the roadway and wherein the controller changes the siren mode upon the vehicle approaching the intersection crossing;
  the driving event comprises a traffic signal indicating for the vehicle to stop; and
  the driving event comprises detecting another vehicle approaching the roadway from a side of the roadway, and wherein the controller changes the siren mode based on the detected another vehicle approaching the roadway.

These and other features, advantages, and objects of the present disclosure will be further understood and appreciated by those skilled in the art by reference to the following specification, claims, and appended drawings.

BRIEF DESCRIPTION OF THE DRAWINGS

FIG. 7 is a flow diagram illustrating a routine for controlling the siren, according to one embodiment.

DETAILED DESCRIPTION OF PREFERRED EMBODIMENTS

Figure 1:
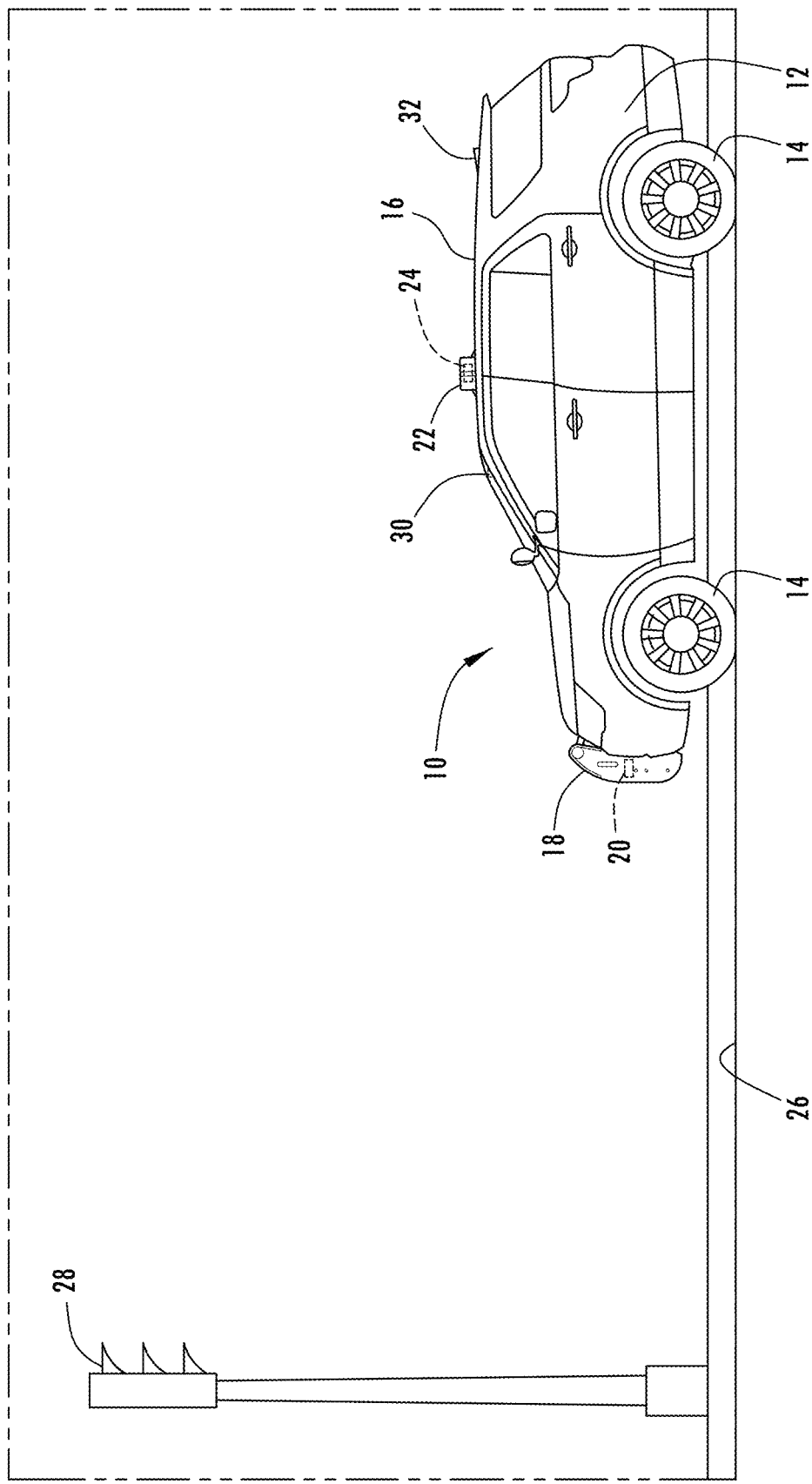
FIG. 1 is a side view of a motor vehicle on a roadway and having a siren controlled based on detected driving events;
In the drawings.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle and vehicle siren system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated located travelling on a roadway 26 and approaching a traffic light 28, according to one example. The motor vehicle 10 has a vehicle body 12 that generally defines a cabin interior typically having a plurality of driver and passenger seats and configured to accommodate a driver and one or more passengers in the vehicle 10. The motor vehicle 10 includes a plurality of wheels 14 in contact with the roadway 26. The vehicle body 12 has a roof 16 with a roof-mounted light bar 22 on the top side and a grille/push light bar 18 on the front end.

The motor vehicle 10 is illustrated as an emergency services vehicle that is equipped with a siren 20 and a plurality of lights 24 for use with emergency services. The emergency services vehicle may be configured as any of a number of vehicles such as a police vehicle, a fire and rescue vehicle, an ambulance and other vehicles equipped with a siren for alerting people, such as pedestrians, bicyclists, and occupants of other vehicles, of the presence of the emergency services vehicle.

In the example shown, the siren 20 is located on the grille/push light bar 18 at the front end of the motor vehicle 10. In addition, the grille/push light bar 18 may be equipped with one or more lights that may operate in a plurality of selectable modes to strobe or flash in predetermined sequences, color, and brightness based on the location of the motor vehicle 10 and one or more detected driving events and inputs. In addition, the roof-mounted light bar 22 is provided on the roof 16 of the motor vehicle 10. The roof-mounted light bar 22 includes a plurality of lights that may, likewise, operate in a plurality of selectable modes to strobe or flash in different colors and patterns, color and brightness based upon the location of the motor vehicle 10 and one or more detected driving events such as objects detected in a pathway of the motor vehicle 10 and inputs as described herein.

It should be appreciated that the motor vehicle 10 may be equipped with one or more sirens, such as siren 20 and that one or more sirens may be located at any of a number of locations on the vehicles such as at the front of the motor vehicle 10 in the grille/push light bar 18, on the roof-mounted light bar 22, or elsewhere on the motor vehicle 10 where the audible tone may be output and heard by operators of other vehicles, pedestrians, bicyclists, and other persons or animals. In addition, any of a number of sirens with or without lights 24 may be located at various locations on the motor vehicle 10, such as on the light bar 22, the grille/push light bar 18, and may be integrated into other lighting on the motor vehicle 10, such as the headlights, turn signals, taillights and other lights that may provide an illuminated visual indication.

The motor vehicle 10 includes a camera system located on the motor vehicle 10 and oriented to capture images of an imaging area along a travel path of the motor vehicle 10. The camera system may include one or more cameras such as an imaging camera 30 shown located generally at or below the roof 16 of the vehicle near the top of the windshield and oriented forward to capture images of the travel path of the motor vehicle 10. The imaging camera 30 captures images of the roadway and surrounding area generally aligned along the travel path of the motor vehicle 10. The captured images are processed by an image processor associated with a controller to identify an event based on the processed signals.

In addition, the motor vehicle 10 is equipped with a navigation system that includes map data including roadways, traffic lights, traffic signs, intersections, sidewalls, and other geographic features. The navigation system may include a global positioning system (GPS) receiver 32 that determines and communicates longitude and latitude position data of the motor vehicle 10. Given the determined location of the position data of the motor vehicle 10, the surrounding landscape may be determined from map data in the local vicinity. For example, the motor vehicle 10 may be detected in a driving event approaching an intersection, a roadway, a streetlight, a road sign or other objects based on the map data knowing the position of these objects and the position and direction of travel of the motor vehicle 10 as determined by the GPS data.

The motor vehicle 10 includes a controller for processing the images captured with the camera system and the map data and identifies one or more driving events based on the processed images and map data and classifies the driving event as one of a plurality of stored driving events. For example, the controller may determine that the motor vehicle 10 is experiencing a first driving event following another vehicle on the roadway, or is experiencing a second driving event approaching another oncoming vehicle, or is experiencing a third driving event approaching a streetlight, or is experiencing a fourth driving event approaching a traffic sign, such as a stop sign, or is experiencing a fifth driving event approaching another vehicle that is determined to be entering the roadway in front of the motor vehicle 10, as several examples of driving events. The classified driving events may include these examples and other examples of driving events. In response to determining the driving event, the controller may activate the siren in a selectable mode to output a pattern having a sequence of audible tones and audible volume based on the classified driving event. In addition, the controller may further activate one or more of the lights in a pattern having light illumination based on the classified driving event.

The siren may be controlled to be activated in a siren mode in a pattern having any of a number of tones or audible volume levels that may be sequenced based on the classified driving event. For example, the siren may be activated in a howler mode which has a low-frequency sound that may obtain the attention of other motorists, pedestrians, bicyclists, etc., in front of an emergency services vehicle by emitting low-frequency soundwaves that other drivers and passengers may feel as vibrations as well as hear the audible sound. Another example of a siren mode may be an airhorn mode which may emit audible sound in repeated short blasts for medium duration or for even longer duration. The airhorn mode may have a deep low sound like that emitted by a tractor-trailer, for example. The siren mode may further include a priority mode which may be a high-pitched rapid repeating firing sound that may be engaged at intersections to alert nearby traffic. A further siren mode may include a yelp mode, which may include a series of short, high-pitched yelps, that conveys a sense of urgency, mandating a quick response by other motorists or pedestrians to move out of the way of the emergency services vehicle. A further siren mode may include a wail mode which is more of a traditional original siren sound that repeats elongated, then fading, high and low frequency sounds. Yet another siren mode may include a two-tone mode in which a high-pitched EEEEEOOOOO, EEEEEOOOOO, for example, is produced which is a sound often used by emergency services vehicles. The siren modes may further include a manual mode which is similar to the wail mode but with arbitrary emphasis on the duration of the high and the low pitch sounds. Finally, in a further example, the siren mode may include a blipper/phaser/piercer mode which generates a short riveting high-pitched ray gun sound that is intense and syncopated.

The siren 20 may be controlled according to the following example. The siren 20 may normally be set to the wail mode when no significant driving events are detected by the imaging camera 30, the GPS navigation, or radar. When the imaging camera 30 detects another vehicle on or near the pathway on the roadway in front or forward of the motor vehicle 10 indicative of a driving event, the siren 20 may be switched to the howler mode. Likewise, when the GPS navigation data detects an upcoming intersection in the roadway as another driving event, the siren 20 can be cycled to the airhorn mode. The changing of one siren mode to another siren mode during different driving events may occur automatically by the controller processing the image data, the GPS data, and radar data according to one embodiment. Further, the siren 20 could be switched to a silent mode during an extended period of no significant driving events such as when the motor vehicle 10 is cruising on a freeway with no immediate approaching traffic, intersections, or roadway signs. It should be appreciated that other selections of siren modes may be automatically controlled by the controller during different driving events, which does not require manual intervention by the driver of the motor vehicle 10.

In addition to controlling the siren 20 amongst a plurality of siren modes during different driving events, the motor vehicle 10 may be equipped with emergency lights and configured to control the lighting pattern from the emergency lights based on the processed images captured with the imaging camera 30 and the GPS navigation data for detecting driving events as determined by the controller. For example, the emergency lights may be changed in light intensity, color, and/or frequency depending on the mode of operation and the frequency of the strobe effect of lighting may be changed automatically during different driving events with the controller without requiring user or manual intervention.

Figure 2:
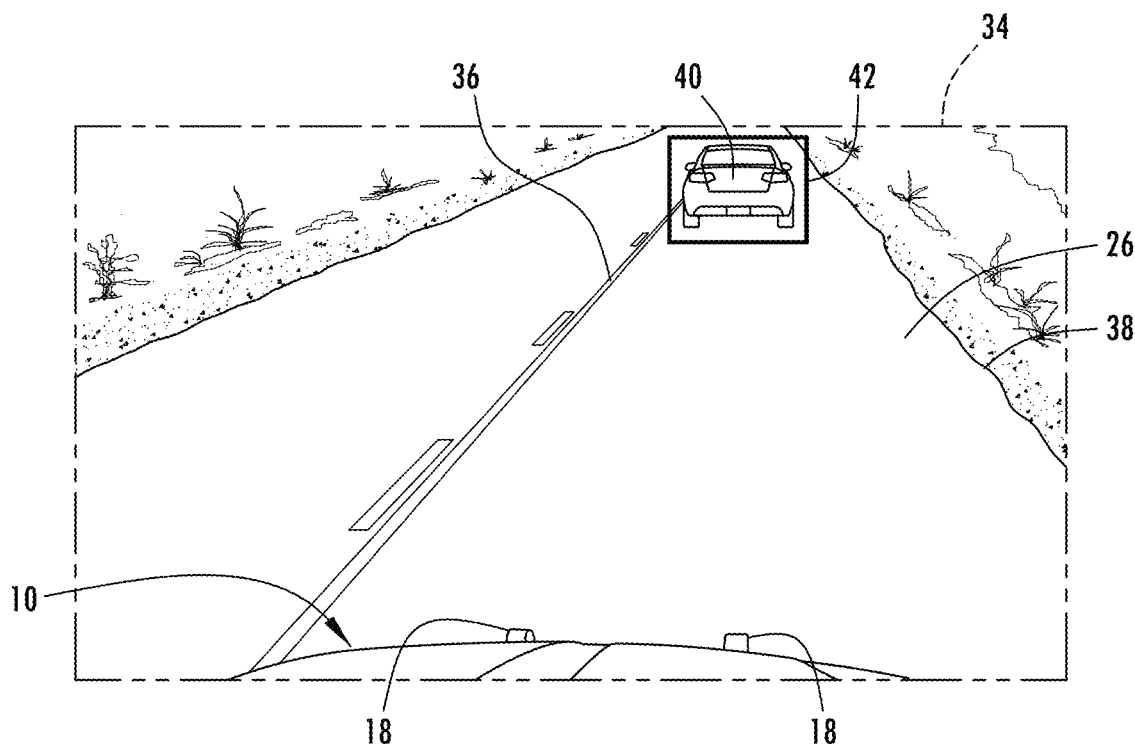
FIG. 2 is a schematic view of an image captured with a camera and used for determining a driving event of another vehicle travelling on a forward path on the roadway.

Examples of driving events that may be detected and used to control the siren 20 are illustrated in FIGS. 2-6. In FIG. 2, the emergency services type motor vehicle 10 captures an image 34 on the roadway 26 defined by centerline 36 and road edge line 38. The image 34 is shown capturing another vehicle 40 forward of the motor vehicle 10 and identified located within a box 42. In this scenario, the controller may process the captured images and map data and determine that the other vehicle 40 is experiencing a driving event in a pathway in front of the motor vehicle 10 such that the siren 20 may be controlled to switch from one siren mode to another siren mode to alert the driver of the other vehicle 40 and others without requiring manual intervention by the driver of the emergency services vehicle 10.

Figure 3:
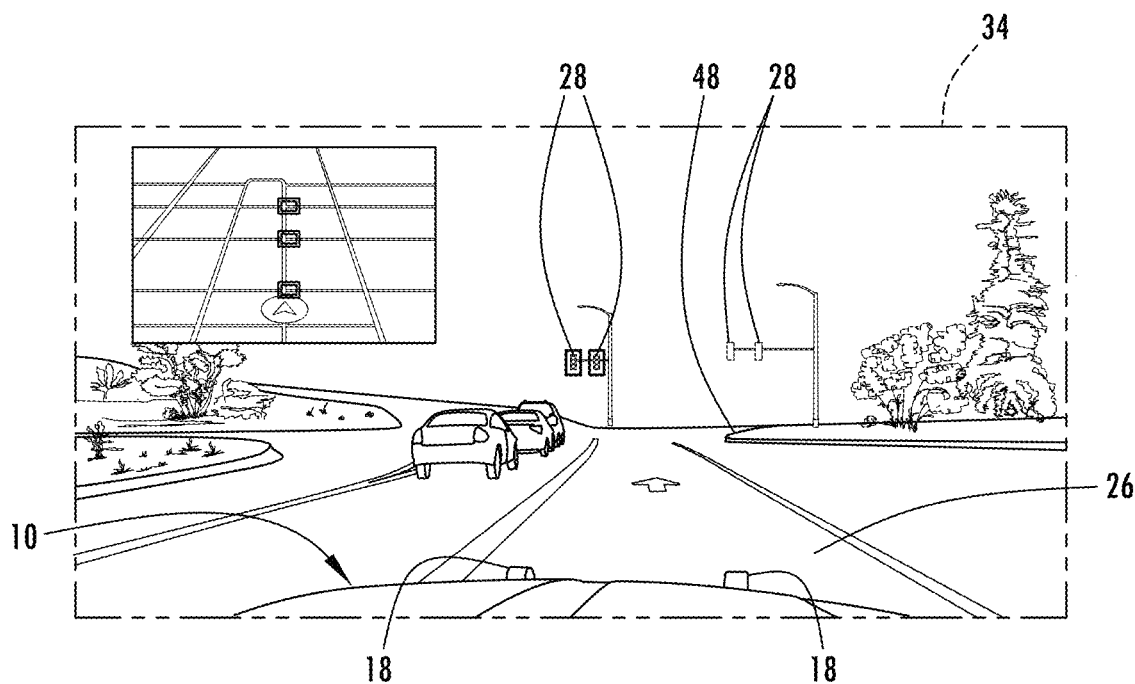
FIG. 3 is a schematic view of an image captured of the roadway forward of the vehicle further illustrating traffic lights at a roadway intersection and a navigation map overlay.

Referring to FIG. 3, the emergency services type motor vehicle 10 captures sequential images 34 of a path on the roadway 26 forward of the motor vehicle 10 which may detect other vehicles in the adjacent lane and may utilize the captured images and/or GPS data to detect the presence of one or more traffic control signals such as streetlights 28 at an approaching intersection 48 which is determined to be another driving event. As the motor vehicle 10 approaches the intersection, the controller may activate the siren 20 to change siren modes based on the presence of the traffic signal indicative of a driving event, as well as the indication on the traffic signal such as whether the traffic signal indicates a green light to proceed or a red light to stop, and may further consider the surrounding vehicle traffic that is detected.

Figure 4:
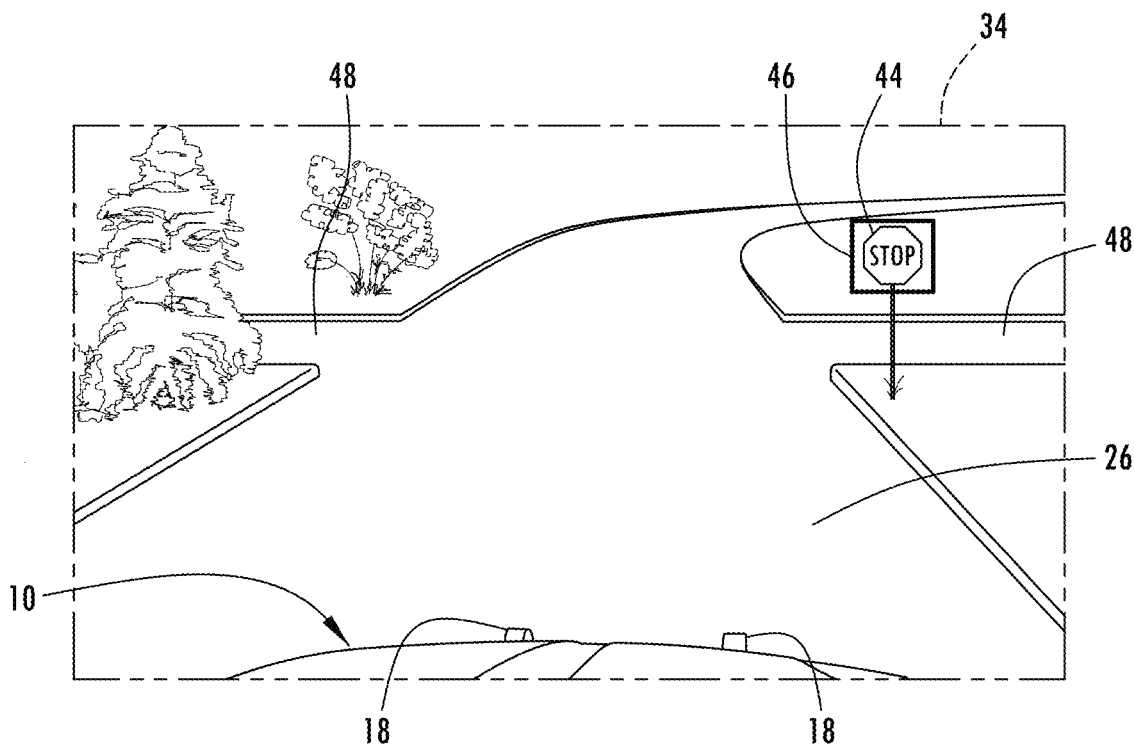
FIG. 4 is a schematic view of an image captured of the roadway illustrating a driving event with a roadway sign at a crossroad.

Referring to FIG. 4, the motor vehicle 10 captures images 34 which are processed to identify a further driving event with a roadway traffic control sign 44, such as a stop sign. It should further be appreciated that the roadway traffic control sign 44 may also be or otherwise detected based on the navigation data and other data such as radar sensed data. As the motor vehicle 10 approaches the roadway traffic control sign 44 at an intersection 48, the controller may activate the siren 20 to change from one siren mode to another siren mode.

Figure 5:
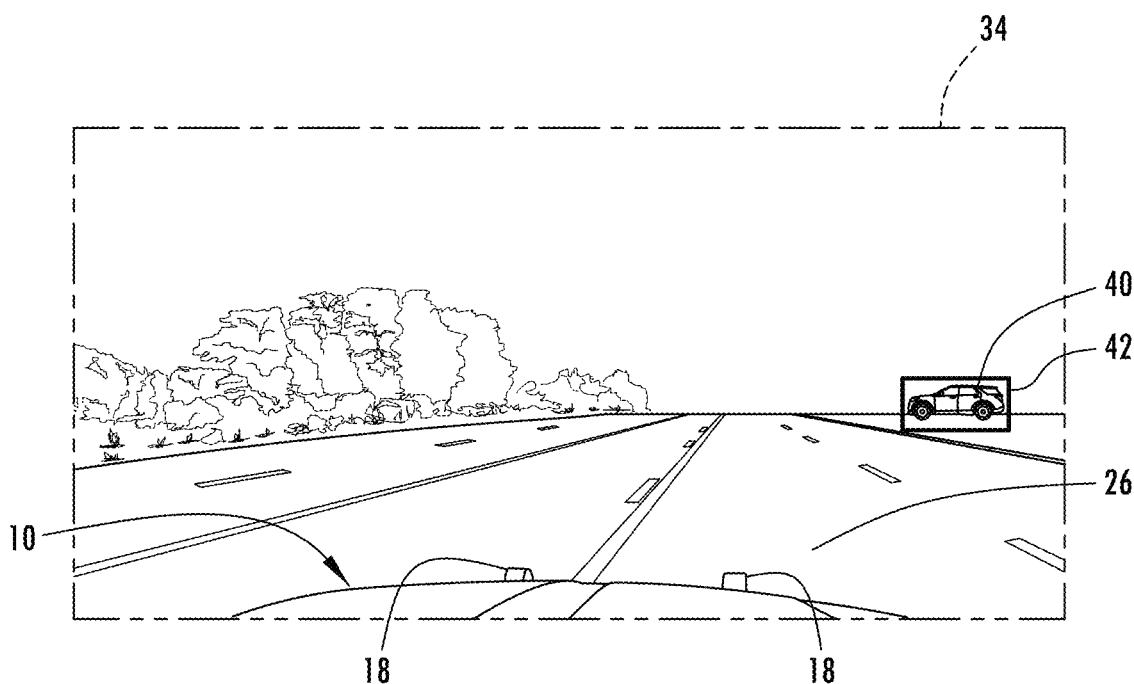
FIG. 5 is a schematic view of an image captured of the roadway showing a driving event with another vehicle approaching the roadway.

Referring to FIG. 5, an image 34 is captured in the pathway of the motor vehicle 10 that detects a further driving event with another vehicle approaching the roadway from a side of the road. In this scenario, the controller may activate the siren to change from a first mode to a second mode as the motor vehicle 10 approaches the other vehicle 40.

It should be appreciated that the motor vehicle 10 may be configured with a controller to change between any of a number of audible siren modes based on the driving event detected and as classified based on the data stored in memory. The classified events stored in memory may be programmed into memory, downloaded from a service programmed into memory, learned from a driving history or otherwise generated.

Figure 6:
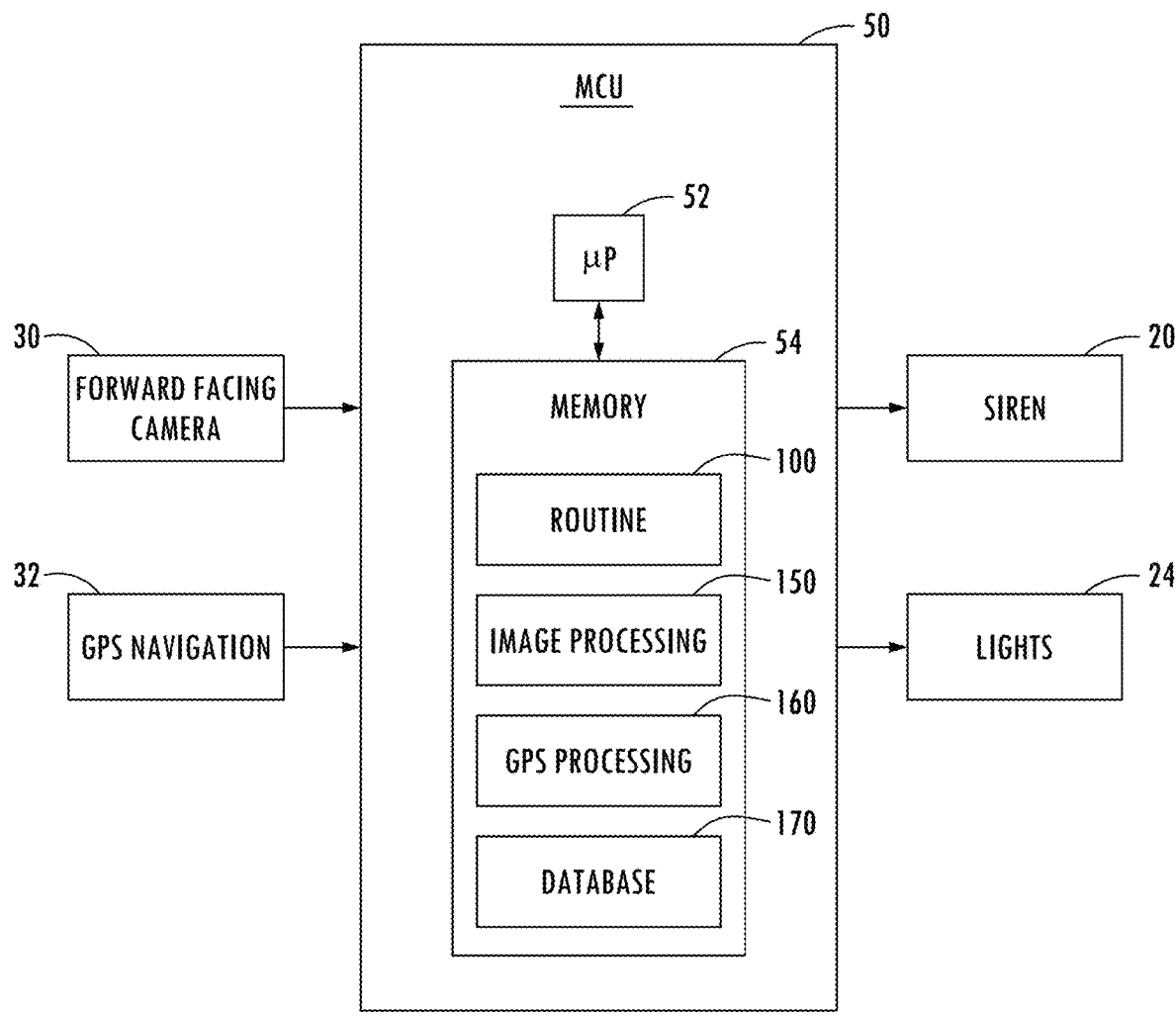
FIG. 6 is a block diagram illustrating processing controls for controlling the siren, according to one embodiment.

Referring to FIG. 6, the controller 50 is generally illustrated as a microcontroller unit (MCU) having a microprocessor 52 and memory 54. It should be appreciated that the controller 50 may otherwise be configured with analog and/or digital circuitry. Memory 54 is shown storing a routine 100 for carrying out a method that is executed by the microprocessor 52. In addition, memory 54 may include image processing circuitry 150, GPS processing circuitry 160, and a database 170 that may be utilized to store a plurality of selectable driving events and a plurality of siren patterns. The controller 50 receives inputs from the forward facing camera 30 and the GPS navigation receiver 32 and processes the images and GPS navigation data according to routine 100 to generate outputs for controlling the pattern of the siren 20 and the pattern of the lights 24.

Referring to FIG. 7, the routine 100 for performing the method of controlling the siren amongst a plurality of siren modes is illustrated, according to one example. Routine 100 begins at step 102 and proceeds to decision step 104 to determine if the emergency siren is turned on or activated and, if not, ends at step 106. The emergency siren may be turned on by an operator of the vehicle, for example. In other examples, the emergency siren may be activated by an emergency service request such as via an incoming emergency notice input. If the emergency siren is turned on, routine 100 proceeds to step 108 to obtain the GPS navigation data which may include the location of the motor vehicle and the surrounding location particularly forward of the motor vehicle. Next, at step 110, routine 100 will obtain the image data from the forward facing camera 30. Next, routine 100 proceeds to step 112 to process the GPS navigation and image data before proceeding to decision step 114 to determine if a significant driving event has been detected. A significant driving event may include any of the driving events illustrated in FIGS. 2-5, for example. If no significant driving event is detected, routine 100 returns to step 108. If a significant event has been detected, routine 100 proceeds to step 116 to classify the significant driving event. The classification of the significant driving event may include identifying the driving event of any of a plurality of driving events including an in-lane traffic driving event 118, an oncoming traffic driving event 120, an upcoming intersection driving event 122, a cross-traffic driving event 124, a traffic signal driving event 126 and a traffic sign driving event 128. Given the classification of the significant driving event, routine 100 then proceeds to step 130 to cycle the siren to the preset pattern for the determined driving event before returning to step 108.

Accordingly, the motor vehicle 10 advantageously employs a siren 20 that may be automatically controlled to alert drivers of other vehicles, passersby, and other persons and animals of the presence of an emergency services type motor vehicle by automatically changing the siren mode of the siren 20 depending on a classified significant driving event, thereby minimizing the manual control of the siren.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
a camera system located on the vehicle and oriented to capture images in an imaged area along a travel path of the vehicle;
a navigation system comprising map data;
a siren located on the vehicle and configured to output different audible sounds in a plurality of siren modes; and
a controller processing the images captured with the camera system and the map data and identifying a driving event external to the vehicle and including the driving event relating to one or more of another vehicle, an intersection crossing on a roadway, a traffic control signal and a traffic control sign based on the processed images and classifying the driving event as one of a plurality of stored driving events, wherein the controller selectively activates the siren in one of the plurality of siren modes based on the classified event.

2. The vehicle of claim 1, wherein the driving event comprises the another vehicle traveling in the travel path of the vehicle.

3. The vehicle of claim 1, wherein the driving event comprises detecting the intersection crossing on the roadway and wherein the controller changes the siren mode upon detecting the vehicle approaching the intersection crossing.

4. The vehicle of claim 1, wherein the driving event comprises the traffic control signal indicating for the vehicle to stop.

5. The vehicle of claim 1, wherein the driving event comprises detecting the another vehicle approaching the roadway from a side of the roadway and wherein the controller changes the siren mode based on the detected another vehicle approaching the roadway.

6. The vehicle of claim 1, wherein the driving event comprises oncoming traffic.

7. The vehicle of claim 1, wherein the driving event comprises approaching the traffic control sign on the roadway.

8. The vehicle of claim 1 further comprising a sensor generating a sensor signal for sensing objects within the imaged area, wherein the controller identifies the event further based on the sensor signal.

9. The vehicle of claim 1, wherein the vehicle comprises an emergency services vehicle.

10. The vehicle of claim 1, wherein the travel path comprises a roadway.

11. A vehicle siren system comprising:
a camera system configured to be located on a vehicle and oriented to capture images in an imaged area along a travel path of the vehicle;
a navigation system comprising map data;
a siren configured to be located on the vehicle and configured to output different audible sounds in a plurality of siren modes; and
a controller processing the images captured with the camera system and the map data and identifying a driving event external to the vehicle and including the driving event relating to one or more of another vehicle, an intersection crossing on a roadway, a traffic control signal and a traffic control sign based on the processed images and classifying the driving event as one of a plurality of stored driving events, wherein the controller selectively activates the siren in one of the plurality of siren modes to generate a pattern having tones and audible volume based on the classified driving event.

12. The vehicle siren system of claim 11, wherein the driving event comprises the another vehicle traveling in the travel path of the vehicle.

13. The vehicle siren system of claim 11, wherein the driving event comprises detecting the intersection crossing on the roadway, and wherein the controller changes the siren mode upon the vehicle approaching the intersection crossing.

14. The vehicle siren system of claim 11, wherein the driving event comprises the traffic signal indicating for the vehicle to stop.

15. The vehicle siren system of claim 11, wherein the driving event comprises detecting the another vehicle approaching the roadway from a side of the roadway and wherein the controller changes the siren mode based on the detected another vehicle approaching the roadway.

16. A method of controlling a siren on a vehicle, the method comprising:
capturing images of a roadway in an imaged area along a path of the vehicle with a camera system;
tracking the path of the vehicle and upcoming features with map data on a navigation system;
determining when the vehicle is approaching a driving event based on the captured images and the map data;
classifying the driving event as one of a plurality of known driving events external to the vehicle and including the driving event relating to one or more of another vehicle, an intersection crossing on a roadway, a traffic control signal and a traffic control sign; and
controlling the siren to operate in one of a plurality of siren modes to generate an audible output in a pattern dependent upon the classified driving event.

17. The method of claim 16, wherein the driving event comprises the another vehicle traveling in the travel path of the vehicle.

18. The method of claim 16, wherein the driving event comprises detecting the intersection crossing on the roadway and wherein a controller changes the siren mode upon the vehicle approaching the intersection crossing.

19. The method of claim 16, wherein the driving event comprises the traffic signal indicating for the vehicle to stop.

20. The method of claim 19, wherein the driving event comprises detecting the another vehicle approaching the roadway from a side of the roadway, and wherein the controller changes the siren mode based on the detected another vehicle approaching the roadway.

* * * * *